United States Patent [19]
Adams

[11] 3,925,870

[45] Dec. 16, 1975

[54] TRUSS ASSEMBLY JIG

[76] Inventor: James D. Adams, P. O. Box 7462, Colorado Springs, Colo. 80933

[22] Filed: Jan. 21, 1974

[21] Appl. No.: 435,201

[52] U.S. Cl............................ 29/200 J; 29/200 A
[51] Int. Cl.² .......................................... B23P 19/00
[58] Field of Search ........... 29/200 A, 200 J, 200 P, 29/200 R, 432, DIG. 13; 277/152

[56] References Cited
UNITED STATES PATENTS

| | | | |
|---|---|---|---|
| 3,068,483 | 12/1962 | Moehlenpah et al. | 29/200 J |
| 3,100,301 | 8/1963 | Black | 29/200 J |
| 3,212,694 | 10/1965 | Sanford | 29/200 A |
| 3,238,867 | 3/1966 | Jureit et al. | 29/200 J |
| 3,399,445 | 9/1968 | Carroll | 29/200 A |
| 3,421,751 | 1/1969 | Menge | 29/200 J |
| 3,681,842 | 8/1972 | Blakeslee | 29/200 A |
| 3,685,129 | 8/1972 | Jureit | 29/200 A |
| 3,693,542 | 9/1972 | Moehlenpah | 29/200 J |
| 3,735,464 | 5/1973 | Linzmeier | 29/200 A |
| 3,768,140 | 10/1973 | Whitney | 29/200 A |

Primary Examiner—Harvey C. Hornsby
Assistant Examiner—Donald B. Massenberg
Attorney, Agent, or Firm—Richard D. Law

[57] ABSTRACT

A truss assembly jig comprising a base means, movable support means having a flat elongated surface for supporting precut wooden members arranged into the shape of at least one structural truss, and a plurality of clamping devices mounted on the surface of the support means for clamping the precut members into position and raising the assembled members for positioning a toothed gusset plate above and below each joint. Two pairs of rollers are positioned at one end of the supporting means with one pair of rollers positioned so as to receive both the support means and the assembled truss thereon so as to partially compress the gusset plates into the members. The second pair of rollers is aligned and positioned to fully compress the gusset plates to securely form the truss in one pass through the rollers. The clamp devices are positioned on the support surface so that the truss assembly will have a slight camber arrangement for prestressing the truss.

10 Claims, 11 Drawing Figures

Fig_5

Fig_6

TRUSS ASSEMBLY JIG

This invention is directed to a roller type press for forming assembled precut members into a structural floor truss. It is more specifically directed to a roller type press having an assembly support surface arranged in conjunction with the rollers whereby precut members may be assembled into the truss and clamped by means of elevating devices whereby the toothed gusset plates may be assembled on the top and bottom surface of the truss at one time so a single pass through the rollers is satisfactory for forming the completed truss.

In the prior art, it has been well known to assembly a plurality of precut wooden members into an arrangement forming a structural truss and clamping these members into proper position. With the members assembled in this fashion, toothed gusset plates are arranged on the upper surface of the truss and the assembled truss is then passed through one or more pairs of rollers to set the gusset plates fully into the surface of the members. After making the first pass through the rollers, the truss is required to be turned over to permit the positioning of the gusset plates on the opposite side. It is again necessary to pass the truss back through the rollers so as to compress the second set of gusset plates to form the completed truss.

It has also been common knowledge that the truss members are conventionally formed in a straight or flat arrangement in preparation for installation in the building structure. It has been found that the straight truss arrangement is unsatisfactory to carry the maximum loads that may be required in the building structure.

An object of the present invention is to provide a truss press machine having an elongated flat support surface upon which the truss can be assembled and elevated for simultaneously positioning the gusset plates on the top and bottom surface.

It is another object of the present invention to provide a truss press machine for structural flat trusses so that a single pass of the truss through the pressing rollers is sufficient to compress the toothed gusset plates on both sides of the truss.

It is a still further object of the present invention to provide a truss forming machine wherein the support surface is of sufficient width to permit at least two trusses to be assembled at the same time.

It is another object of the present invention to provide a truss forming machine wherein the support surface for the assembly of the truss is formed from an endless conveyor wherein rigid plates are provided over a portion of the length of the conveyor and forming a flat surface having a sufficient length for the assembly of the trusses.

Another object of the present invention is to provide a flat truss press which is both economical to manufacture and simple to operate so that only a minimum amount of time is required for forming and completing the individual trusses.

The present invention provides a roller type press having two pairs of rollers arranged parallel and in alignment with each other. A support table, having an elongated flat surface, is arranged to pass at least through the first pair of rollers and includes clamping devices arranged on the surface of the table to clamp the individual precut wooden members into the final position for forming the flat truss. In addition to clamping the members together, a provision is provided for raising the entire truss structure above the surface of the table so that the gusset plates may be positioned on both the top and bottom surface at each joint of the members. After the bottom toothed gusset plates have been positioned, the truss is released to rest on the gusset plates upon the surface of the table. The first pair of rollers is positioned inwardly from one end of the support table surface so that the truss and the movable table surface are passed through the first pair of rollers, embedding the teeth of the gusset plates approximately 90 percent into the surface of the truss members. The truss by itself then passes through the second pair of rollers to fully embed the teeth in the surface of the truss members to set the gusset plates and complete the formation of the structural truss.

The movable support table surface for the assembly of the structural flat trusses has sufficient width to permit the formation of at least two trusses on the surface at the same time. The movable table surface is formed on an endless chain configuration having a pair of endless chains reeved around sprockets mounted on shafts at each end of the table surface. Rigid slats, arranged transverse to the chains, are mounted on the outer surface of the chains in parallel contiguous position with each other forming a support table surface of sufficient length for the formation of the trusses and extends up to one-half of the overall length of the conveyor assembly. In this way, as the trusses are fed through the rollers, the table surface passes through the first pair of rollers and is returned to its original position ready for the assembly of the next pair of trusses.

The individual clamping devices arranged around the perimeter of each of the trusses is mounted to the surface of the support table by means of fastening devices, such as bolts. A plurality of holes for mounting clamps centrally along the longitudinal axis of the table are provided. An additional pattern of holes on each edge of the table surface are arranged to accommodate trusses of various widths and to permit arrangement of the clamps so as to form a preset camber along the length of each truss. The preset camber in the truss essentially prestresses the truss to allow a substantially greater load carrying capacity for the truss when installed. Thus, the present invention permits the formation of a truss with a large degree of camber curvature.

The toothed gusset plates intended to be used with this device are of the type having elongated, relatively narrow teeth formed by cutting V-portions and bending them at right angles to the body of the gusset plate. Thus, the teeth are embedded into the fibers of the wood members by the compressive action of the rollers provided in the invention.

One or two drive motors mounted in the base structure of the machine are drivingly connected through speed reducers and sprockets so that the speed of the rollers is coordinated with the lineal movement of the support table as it passes into the first set of rollers.

Other objects of this invention will appear in the following description and appended claims, reference being made to the accompanying drawings forming a part of the specification and like reference characters designate corresponding parts in the several views.

Figures 1, 2:
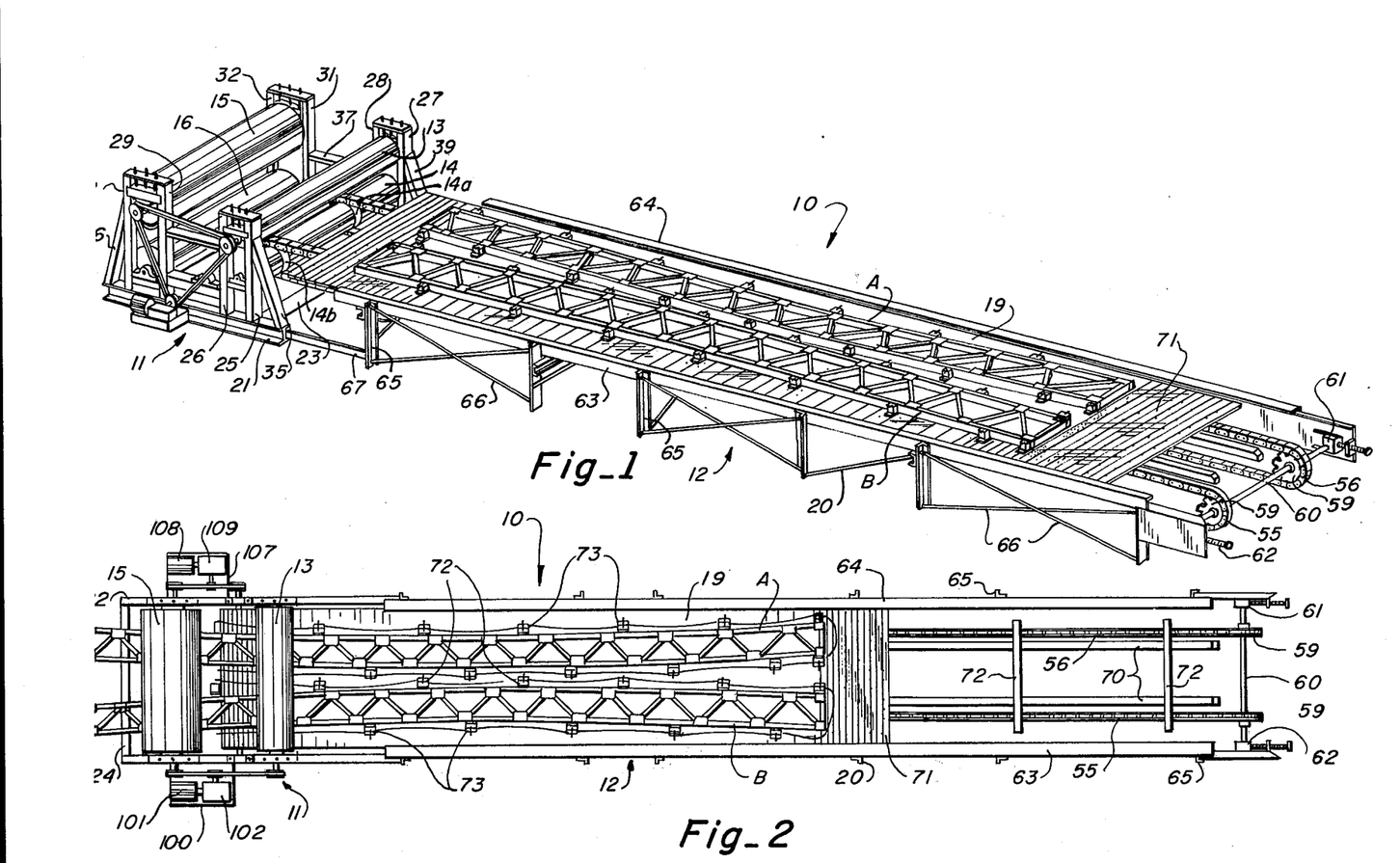
FIG. 1 is a pictoral perspective view of the press machine including a pair of trusses positioned on the surface of the movable table.
FIG. 2 is a top plan view of the press according to this invention showing the trusses partially extended through the compression rollers.

Turning now more specifically to the drawings, FIGS. 1 and 2 show the overall view of the truss press machine 10 according to this invention. The machine 10 includes a compression roller assembly 11 and a movable support structure 12 upon which the trusses are assembled. The compression roller assembly 11 includes a first pair of rollers 13, 14 and a second pair of rollers 15, 16 which are arranged in alignment with each other for seating the gusset plates 17 which hold the individual precut members 18 in a prearranged position to form the finished trusses. The movable support structure 12 includes a substantially flat table surface 19 and support framework 20. Two assembled trusses A, B are shown arranged on the movable table surface 19.

The trusses A and B are formed by arranging precut wooden members 18 in a suitable pattern to form the finished truss. In order to secure the individual members 18 in their proper relation, gusset plates 17, having teeth extending outwardly from one side and which are generally well known in the art, are positioned so as to overlay each joint between the individual members. To provide the necessary rigidity, these plates must be positioned on each side of the joint and the plates must be compressed so that the teeth are firmly embedded in the fibers of the wooden members. In this way, a strong and rigid unitary structure which is suitable for use in the building industry is obtained. For illustrative purposes, the drawings and specification of this application are directed to the formation of floor-type trusses, as represented by the letters A and B in the drawings. It is to be understood, however, that this invention is not to be limited solely for use in making floor-type trusses, but can be used in the formation of any type truss desired.

Figure 3:
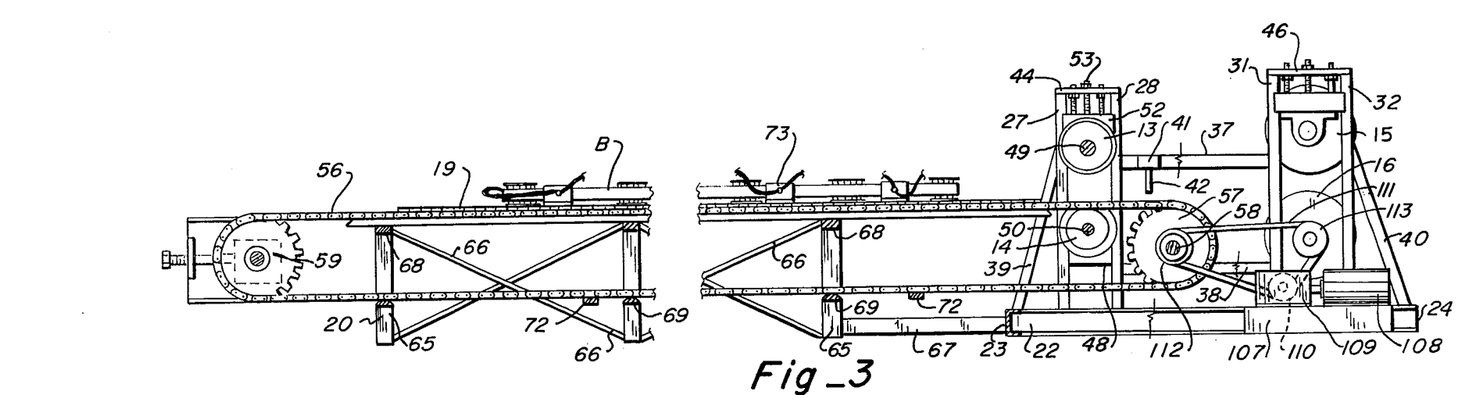
FIG. 3 is a side elevation view of the truss press machine according to this invention showing the trusses positioned upon the upper surface of the movable table support.
Figure 5:
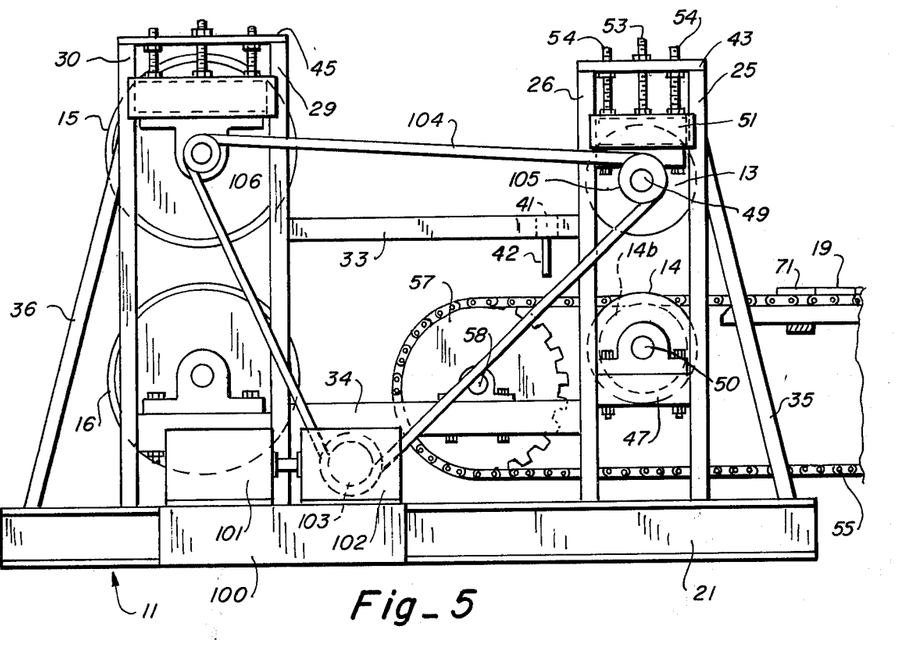
FIG. 5 is a partial side view showing the roller arrangement with a portion of the table conveyor sprocket positioned between the first and second pair of rollers.
Figure 6:
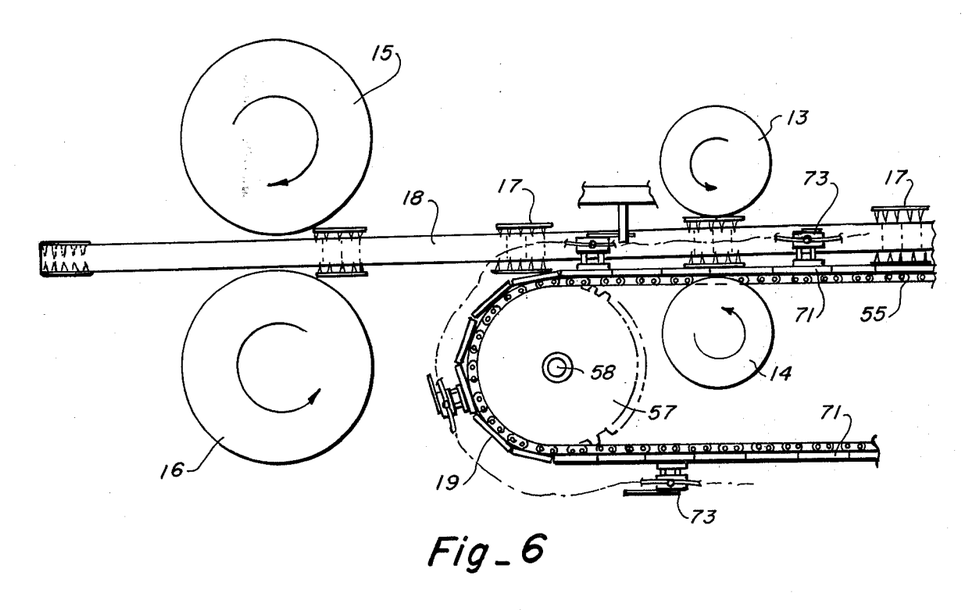
FIG. 6 is a diagrammatic view of the truss passing through the first set of rollers for partial compression of the gusset plates and the complete compression of the gusset plates after passing through the second pair of rollers.

The compression roller assembly 11 is essentially a framework for the mounting and support of the rollers 13, 14 and 15, 16. The framework consists of two I-beams 21, 22 arranged parallel to each other and disposed to form the sides of the base of the framework. Two cross beams 23, 24 are positioned at right angles to the side beams 21, 22 and are joined, as by welding or bolting, to rigidly space and hold the beams 21, 22 in position. In order to support the first pair of rollers 13, 14, two pairs of channel or U-shaped beams 25, 26 and 27, 28 are mounted respectively in an upright position on each of the side beams 21, 22. These beams are arranged parallel to each other so as to provide a rigid support for the rollers 13, 14. In like token, support beams 29, 30 and 31, 32 are provided also on the side beams 21, 22 for the support of the second pair of rollers 15, 16. The first set of support beams 25, 26 and 27, 28 are shorter than the second set and are positioned towards the movable support structure 12. Intermediate cross support members 33, 34 are arranged between the roller support beams 26 and 29, with diagonal braces 35, 36 provided at each end of the structure to form a rigid support framework on one side. On the opposite side, intermediate cross members 37, 38 and diagonal braces 39, 40 are provided. A transversely extending cross beam 41, having at least two downwardly extending pins 42, is provided between the intermediate members 33 and 37. The pins 42 are adjustably positioned in the transverse direction for release of the truss clamping devices which will be described later. Cap plates 43, 44 and 45, 46 are joined to the upper ends of the roller support beams, as shown in FIGS. 3 and 5.

The first pair of rollers 13, 14 are fixedly attached to individual shafts 49, 50 which are arranged to extend outwardly from the ends of the rollers. The lower roller 14 is mounted in suitable bearings on the fixed bearing blocks 47, 48 so as to be freely rotatable. The upper roller 13 with its respective shaft 49, is mounted in suitable bearings attached to the adjustable bearing blocks 51, 52. The upper bearing blocks 51, 52 are suspended from the cap plates 43, 44 and are arranged to be vertically adjusted by means of the center adjusting screws 53 and the side adjusting screws 54. Threaded nuts are provided on the center adjusting screws 53 for supporting the bearing blocks 51, 52 and nuts are provided on the side adjusting screws on the bottom side of the cap plates 43, 44 for providing the downward force for the roller during the compression of the truss gusset plates 17. A similar structural arrangement is provided for the mounting and support of the second pair of rollers 15, 16.

In the present embodiment, the first pair of rollers have a diameter of approximately 12 inches, while the second pair of rollers have a diameter of approximately 20 inches. Although the rollers may have any diameter desired, it has been found that the present arrangement provides the necessary rigidity to properly compress and embed the gusset plates in the truss members for forming a desirable product. As can be seen in FIG. 5, the lower rollers of each pair are mounted so that their upper surfaces are generally aligned and lie in the same plane as the table surface 19. The bottom roller 14, however, is slightly lower to compensate for the thickness of the table surface 19, since both the truss and the table pass through the rollers during the first compression operation. In addition, circumferential grooves 14a and 14b may be provided in the lower roller 14 to receive the conveyor chains which will be described later.

The movable support structure 12 is formed from an endless conveyor arrangement consisting of a pair of endless chains 55, 56. One end of the chains are reeved over a pair of sprockets 57 which are mounted on a shaft 58 which is suitably supported in bearings on the intermediate cross members 33, 34. In this way, the shaft 58 is mounted between the bottom rollers 14 and 16 of the roller press. The opposite ends of the chains 55, 56 are reeved around idler sprockets 59 which are fixedly mounted on shaft 60. The shaft 60 is mounted in adjustable bearing blocks 61, 62 which are provided at the end of the movable support structure 12 and are arranged so that the shaft 60 may be moved longitudinally to maintain proper tension in the chains 55, 56 during operation.

A drive support structure 100 is attached to the side of the roller support beam 21 and is arranged to receive a drive motor 101 which is drivingly connected to a right angle speed reducer 102. The output shaft of the reducer 102 is arranged to extend inwardly toward the roller structure and include a drive sprocket 103. An endless drive chain 104 is connected between the sprocket 103 and sprockets 105 and 106 mounted on the shafts for upper rollers 13 and 15, respectively.

A similar drive assembly consisting of drive support structure 107, drive motor 108 and speed reducer 109 is mounted along the opposite side of the compression roller assembly 11 and is attached to the side beam 22. A chain sprocket 110 mounted on the output shaft of the speed reducer 109 is drivingly connected by means of an endless chain 111 to sprockets 112 and 113 mounted on the conveyor drive shaft 58 and lower roller 16, respectively.

As can be seen, the lower roller 14 is not driven and is free to rotate with the conveyor chains 55, 56 and slats 71.

It is to be understood that endless belts and pulleys can be substituted for the chains and sprockets described. It is intended, however, that the circumferential speed of the rollers and the lineal speed of the conveyor are to be identical so that there will be no slippage of the rollers on the trusses and gusset plates as they pass therethrough. This speed relationship can be easily coordinated by properly designing the diameters of the drive and driven sprockets or pulleys.

The movable support structure for assembly of the trusses A and B consists of the side rails 63, 64 which are mounted on legs 65, forming the support framework 20. Diagonal cross braces 66 are provided between the legs 65 and longitudinal braces 67 and are positioned between the side beams 21, 22 and the adjacent legs 65. Upper supports 68, having longitudinally mounted rails 70, are provided laterally between the legs 65. Lower supports 69 are provided to support the lower return length of the chains 55, 56. The upper surface of the lower supports 69 can be provided with a friction reducing material, such as Teflon or wood, to allow the chains and the table surface 19 to pass easily over the supports. The rails 70 are arranged parallel to and spaced laterally from the chains 55, 56 and are positioned so that their upper surface coincides with the elevation of the upper edge of the chains. It is to be understood that any number of support rails can be provided which is sufficient to support the table surface 19.

The table surface 19 is formed from a plurality of rigid slats 71 which have a length which corresponds to the width of the desired table surface 19 and fit under the lips of the side rails 63, 64. The slats 71 are individually mounted on the upper surface of the links of the chains 55, 56 and are positioned perpendicular to the longitudinal axes of the chains. These slats are not connected to each other, but are solely connected to the chain links to allow the slats to move individually and rotate with the links to follow the path of the chains. The bottom surface of the slats 71 is arranged to be supported on the support rails 70 and the upper surface of the rails can be provided with a material, such as Teflon or wood, which produces a low coefficient of friction to facilitate the longitudinal movement of the slats 71. Any number of slats 71 can be used which will provide the desired length of the table surface 19 necessary to accommodate the assembly of the desired trusses. Although the slats can be provided around the entire length of the chain conveyor, it is preferred that the slats will be provided over a length of approximately one-half or less of the entire length of the chains 55, 56. In this way, the upper, horizontal length of the chains will be substantially covered. In addition, it is to be understood that the width of the table surface 19, formed by the slats 71, can be arranged as desired to provide whatever assembly surface is required for one or more trusses. In like token, the length of the rollers and their supporting structure would also be modified to correspond to the width of the table surface 19.

Those portions of the chains 55, 56 which are not interconnected by the slats 71, can have individual, spaced, cross tie members 72 included to maintain the chains in a proper lateral spaced position with respect to each other.

One of the novel features of the present invention is provided in the use of clamping devices which hold the assembled trusses A and B in proper position and which permit the assembled trusses to be elevated above the table surface to allow the positioning of the gusset plates on the top and bottom of each of the truss joints. In the present arrangement, each of the entire trusses are elevated simultaneously as a unit to permit the positioning of all of the gusset plates to permit the truss to be completed by a single through the compression rollers.

The truss clamping or holding devices 72, 73 are detachably mounted to the surface of the slats 71 and are spaced on each side of the longitudinal sides of the individual trusses. Two types of holding devices are provided in the present invention. The stop or rigid devices 72 are provided generally down the central portion of the table surface 19 and provide a block or backstop against which the trusses are formed during the assembly of the precut members. The opposite longitudinal sides of the trusses have a plurality of spaced extendible clamping devices 72 which have a face plate member which is extended by means of a cam arrangement to contact the sides of the truss and clamp all members of the truss into a rigid position.

Figure 4:
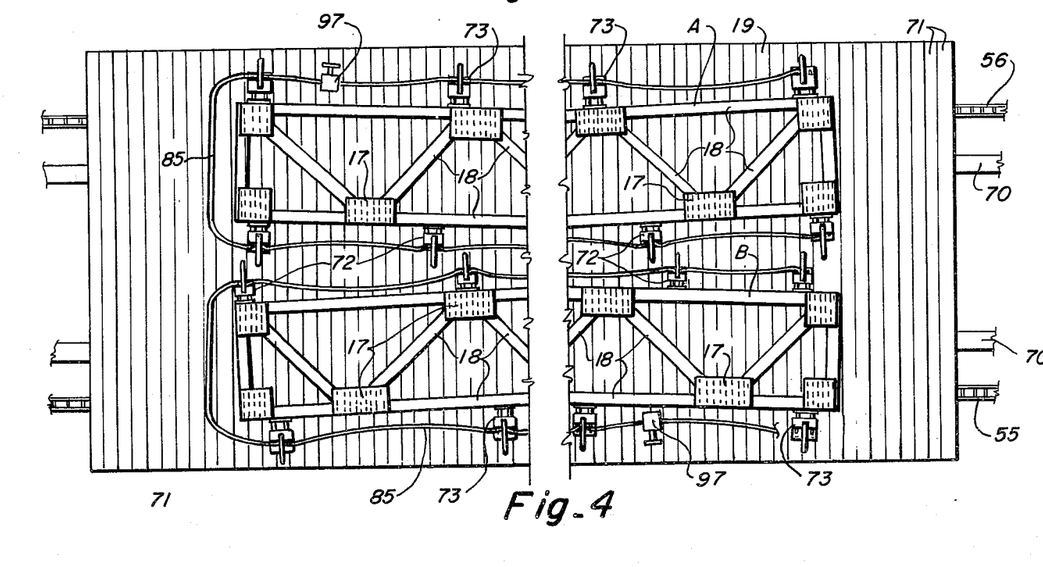
FIG. 4 is a top plan view of the table surface showing the truss members and gusset plates arranged for the compression operation.

As seen in FIG. 4, the centrally located clamping devices are located near the central portion of the table surface 19 and can be arranged in a longitudinally aligned position when fabricating straight trusses. The stop devices can also be positioned in a slight arcuate pattern to impart a cambered arrangement to the finished truss which has been found to be more desirable. Thus, with the press machine as described in the present invention, either straight or cambered trusses can be provided, depending upon their desired strength and use.

The movable clamping devices 73 have a generally flat base plate 74 and a body member 75. The base plate 74 includes a pair of apertures 76 provided near the edge for securing the base plate 74 to the upper surface of the slats 71. The fastening apertures 76 can be either a circular configuration or an elongated slot arrangement to provide minor adjustments in the position of the clamping device 73. A second pair of holes 77 arranged near the opposite edge of the base plate 74 are provided for attaching a pair of solid cylindrical pistons 78 in an upward perpendicular position from the upper surface of the plate 74. The piston mounting holes 77 are countersunk from the bottom side of the plae 74 to accommodate flush mounted screws 79 for holding the cylinders in position.

The body 75 of the clamping device, which is of the same general width as the base plate 74, but approximately one-half the length, includes a pair of blind bores 80 having cylindrical inserts 81 mounted therein. The inside diameter of the inserts 81 is sized to slidably receive the pistons 78. In this way, a piston and cylinder arrangement is provided for slidable movement of the body member 75 in an upward direction with respect to the base plate 74. A threaded bore 82 is provided on the rear surface of the body member 75 and laterally extending passageways 83 are drilled from the base of the bore 82 into each of the inserts 81 to allow the introduction of a pressurized fluid for raising the body member 75. A suitable fitting 84 can be inserted into the threaded bore 82 for the connection of tubing 85 for the transmission of the pressurizing fluid. It is to be understood that any type of pressurizing medium can be utilized with the clamping devices, such as hydraulic fluids or gases, with the preference given to pneumatic gases since a cleaner operation can be provided.

A stop arrangement (not shown) is provided in conjunction with each piston and cylinder to limit the upward travel of the body 75 with respect to the base plate 74. This stop arrangement can be a pin and slot wherein a longitudinal slot is provided in the piston 78 with a pin inserted through the body member 75 and through the sleeve or insert 81.

Figure 8:
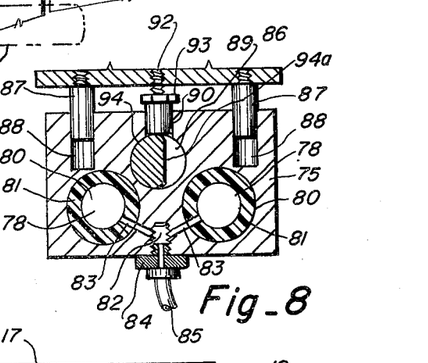
FIG. 8 is a cross sectional view taken along line 8—8 of FIG. 9 showing the mechanism for extending the clamping member and the pneumatic cylinder for raising the clamp and truss.
Figure 9:
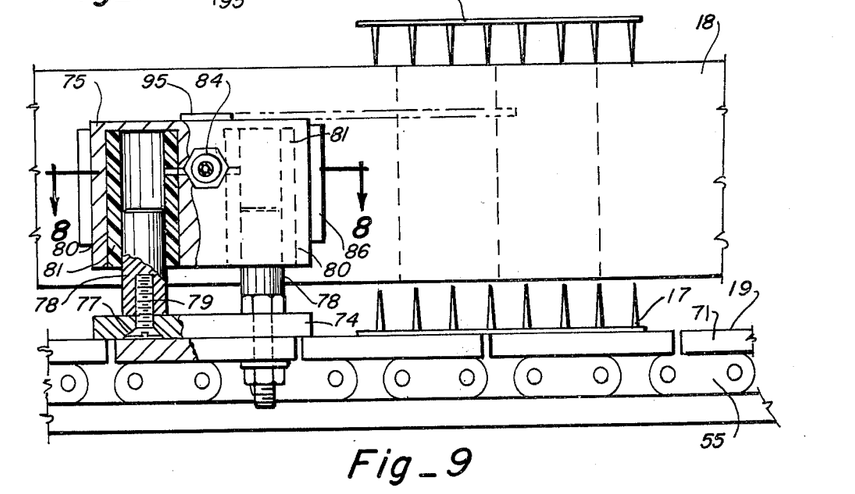
FIG. 9 is a partial side view showing the clamping device in the truss elevating position with a portion of the clamping device cut away to show the air raising cylinder arrangement.
Figures 10, 11:
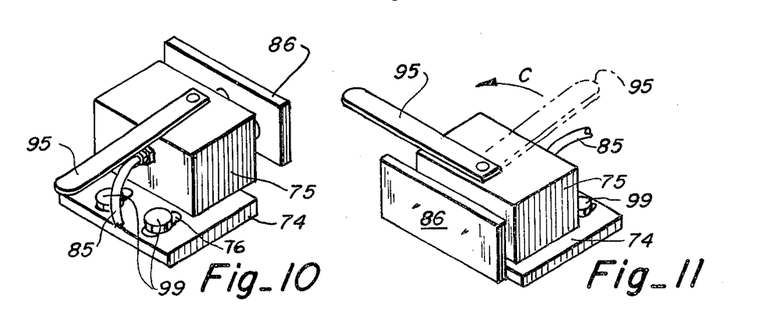
FIG. 10 is a perspective pictorial view of the clamping device with the handle positioned for extending the clamping member.
FIG. 11 is a pictorial perspective view of the clamping device with the handle shown in the released position for withdrawing the clamping member from the side of the truss.

The clamp body member 75 includes a face plate 86 having guide pins 87 provided on the rear surface which are arranged to be slidably mounted in holes 88 provided in the body member 75. The mechanism for extending and actuating the face plate 86 includes a vertical bore formed in the body member 75 generally between the cylinder bores 80 and arranged to extend downwardly from the top surface of the body. A second bore 90 extends inwardly from the front face of the body 75 and intersects the vertical bore 89. A cam piston 91 is inserted in the front bore 90 and includes a central opening which receives a threaded screw 92 extending from the rear surface of the face plate 86. An adjusting nut 93 is provided on the threaded screw 92 at the outer edge of the cam piston 91 so that the outward projection of the face plate 86 can be adjusted for various dimensional differences encountered with the various trusses being assembled. A rotatable cylindrical cam member 94, which has a portion of one side removed, as shown in FIG. 8, is positioned within the vertical bore 89 and provides a cam surface 94a, for extending and retracting the face plate 86.

Figure 7:
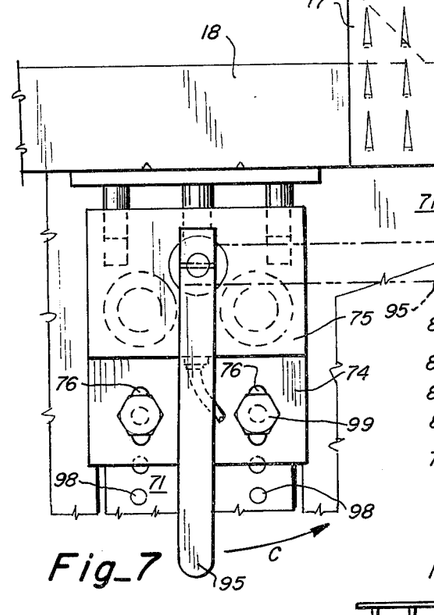
FIG. 7 is an enlarged partial top view of the clamping devices shown in the extended position for holding the individual truss members in position showing the gusset plate arranged at the junction of the truss members.

As shown in FIG. 7, an elongated exterior handle 95 is securely attached to the upper end of the cam cylinder 94 in a position whereby the handle is aligned parallel with the flat cam surface 94a. Thus, when the handle is positioned perpendicular to the face plate 86, the cam piston 91 is extended to its furthest dimension, causing the face plate 86 to be extended. As the handle is moved in a direction shown by arrow C, the face plate 86 is released, allowing it to move to a retracted position near the front face of the body member 75. Although a spring biasing arrangement can be provided for retracting the face plate 86, it has been found that this may be unnecessary due to the compressive forces created in the truss when the face plate 86 is extended by movement of the handle 95. Thus, as the handle is moved a short distance from its clamping position so that the rounded portion of the cam surface 94a crosses the centerline of the cam piston 91, the compressive forces in the truss will cause the face plate to retract, moving the handle to the unlocked position. A pin stop can be provided in the upper surface of the body member 75 to prevent the handle 95 from being moved beyond its locking position. Two or more short spike projections 96 can be provided on the outer surface of the face plate 86 so that they will be embedded in the surface of the truss when the clamp is actuated to allow the face plate 86 to better grip and hold the truss member.

The stop devices 72 provided along the opposite side of the truss from the movable clamping devices 73, have substantially the same structure as described for the movable clamping devices 73, except that the face plate 86 and cam mechanism are omitted. Short spike projections similar to 96 can be provided on the front face of the body member 75 and are included for providing the gripping feature to hold the truss member in contact with the body member. Thus, as can be seen, both the stop devices 72 and movable clamping devices 73 provide the elevating function for elevating the truss above the table surface 19 during use. The tubing 85 is arranged to interconnect all of the stop devices 72 and movable clamping devices 73 in series to form a closed loop around the entire truss assembly. A connector 97 can be mounted in the tube circuit 85 to allow an external source of pneumatic pressure to be connected to the loop so as to simultaneously energize all of the clamping devices to raise the entire truss as a unit above the table surface 19.

In order to properly position the stop devices 72 and movable clamping devices 73 around the perimeter of each of the trusses, a plurality of threaded mounting holes 98 are provided in each of the slats 71. Various hole patterns can be provided with holes 98 provided along the central portion of each slat for the mounting of the stop devices 72 and a separate pattern of holes provided along or near the outer edges of the slats 71 for mounting the movable clamping devices 73 along the outer edge of the trusses. Mounting bolts 99 are used for mounting the base plates of each of the clamping devices in their proper position to form the desired straight or cambered truss.

In operating the floor truss press 10, the table surface 19 formed by the plurality of articulated slats 71 is positioned at the top of the movable support structure 12 for assembling the precut members of the individual trusses. The stop devices 72 are positioned along the central portion of the table surface 19 so as to define the desired profile of the finished trusses. When it is desired to provide trusses having a slight camber, the stop devices 72 will be arranged to have a slight bow, as shown in FIG. 2, to prestress the finished trusses. The movable clamping devices 73 are then arranged along the outer edge of the table surface 19 in proper position to provide the desired width of the trusses and to allow the clamps 73, when extended, to contact the side of the truss and generate the necessary compressive holding forces. With the clamps properly positioned, the precut truss members 18 are assembled in the desired shape and position to form the finished truss. The handles on the outer movable clamping devices 73 are then moved to the outer clamping position so that the face plates are extended to hold the clamp members in the assembled arrangement.

A source of pneumatic or hydraulic pressure is then connected to the connector 97 to pressurize the tubing 85 so that all of the clamping devices and the individual truss will be simultaneously elevated a desired distance above the table surface 19. This height is intended to be sufficient to allow the gusset plates to be positioned under the truss joints with the teeth of the gusset plates extending upwardly toward the truss members. Gusset plates are also positioned on the top surface of the truss at each joint and the plate can be tapped with a mallet or hammer to start the teeth into the surface of the truss members. Once this step has been accomplished, the pneumatic pressure is released by disconnecting the connector 97, allowing the clamping devices and truss to settle to a point where the truss is resting on the teeth of the bottom gusset plates.

Once the gusset plates have been positioned, the rollers are set to provide the required clearances, and the drive motors for the roller assembly and conveyor are energized and the table surface 19, with the assembled trusses A and B, is moved toward the first pair of rollers 13, 14. As the trusses A and B and the table surface 19 pass through the first set of rollers, the gusset plates are embedded approximately 90 percent into the fibers of the wooden truss members. As each of the movable clamping devices 73 moves past the first set of rollers 13, 14, the handles 95 of the clamping devices 73 contact the downwardly projecting pins 42 provided along each side of the conveyor, causing the handle to move from its clamping position to the release position, allowing the face plates 86 to retract from the sides of the trusses. It is intended that the release pins 42 will be positioned laterally with respect to the conveyor in order to be in a proper position to release all of the clamps as they move past the pins 42. As the slats 71 reach the drive sprockets 57, the chains 55, 56 and slats 71 rotate downwardly for the return travel. The partially compressed truss is fed directly into the second pair of rollers 15, 16 which has been adjusted to complete the embedding of the gusset plate teeth fully into the trusses. As the completed trusses A and B are ejected from the second pair of rollers, the assembly table surface 19 follows a path along the underportion of the movable support structure 12 and returns to its original position at the top of the structure.

It is to be understood that, if desired, a separate flat, rigid table surface can be provided so as to rest on the top portions of the endless chains 55, 56 so as to replace the individual slats 71. Thus, the separate table surface with the clamping devices and trusses mounted thereon can be arranged to pass directly through both the first and second pair of rollers along with the trusses, with the table surface being returned to the conveyor section manually after the completed trusses have been removed.

The materials to be used in this invention are intended to be of the common types. The outer surface of the rollers is intended to be formed from a hardened material, such as steel, which would have sufficient strength and rigidity for the compression function, with no apparent wear during use. The table slats can be made from a hard, rigid material, such as aluminum alloy or steel, with a thickness which will maintain a flat configuration and withstand repeated use without distortion. Synthetic plastics and resins can be used where desired to reduce weight and expense and to provide a frictionless characteristic, as required, for the table slat support rails or the body inserts for the clamping devices.

When the jig is used for making a single truss, some side movement may occur as the truss is moved through the rollers. Such side movement may be eliminated by welding extending guides to the bottom of the plates 71, preferably in the middle, and these may be narrow and extending from one-half to 2 inches. To hold the guides as they pass the roller 14, the roller may be provided with a peripheral groove, similar to grooves 14a and 14b, accommodating the guides and preventing side movement while maintaining the plates 71 in the same horizontal alignment.

While a truss press machine has been shown and described in detail, it is obvious that this invention is not to be considered to be limited to the exact form disclosed and that changes in detail and construction may be made therein within the scope of the invention, without departing from the spirit thereof.

Having thus described the invention, what is claimed is:

1. A truss assembly jig for forming at least one structural truss by joining a plurality of individual precut wooden members, the truss joints being made by compressing and embedding toothed gusset plates on each side of the joints of the individual members, the jig comprising:
  a. base means;
  b. movable support means mounted on said base means and having a flat elongated surface for supporting the precut members arranged into the shape of at least one structural truss;
  c. a plurality of clamping means mounted on said support means and arranged around the outside of the perimeter of a held truss to hold the assembled members in truss position, said clamping means including means for elevating the held truss members above the surface of the support means to permit the positioning of the gusset plates on each side of the joints of the held individual precut members;
  d. first roller means mounted on said base means and having a pair of spaced apart, opposed substantially vertical rollers arranged with their bite horizontally aligned with said support means for passing said support means therethrough, one of said rollers being disposed beneath said surface, aid rollers being arranged to receive said movable support means and at least one truss thereon, so as to partially embed the gusset plates into said precut members passing between said roller means, said first roller means further including means following said roller means to sequentially release each clamping means after it passes through said roller means to free the truss;

e. a second roller means mounted on said base means and having a pair of spaced apart, opposed substantially vertical rollers horizontally aligned with said first roller means and arranged to pass at least one truss therethrough after it passes said first roller means so that said gusset plates are fully compressed and embedded into said precut members to form said structural truss; and f. said movable support means includes power drive means drivingly connected to said support means and said first and second roller means, whereby said movable support means is moved toward said first roller means at a lineal speed which is equivalent to the rotative speed of said first and second roller means.

2. A jig as defined in claim 1, wherein:

said plurality of clamping means are arranged to permit the assembly of one or more trusses and the portion of the endless conveyor containing said clamping means is returned to its initial position after the assembled trusses have passed through the first and second roller means.

3. A jig as defined in claim 1, wherein:

said clamping means includes securing means for fastening the clamping means in various locations on the surface of said support means so that trusses of various shapes and sizes can be formed.

4. A jig as defined in claim 1, wherein:

said first and second roller means includes means for adjusting the space between the vertical rollers to a predetermined dimension so that the amount of compression applied to said gusset plates can be controlled and the first and second roller means can be adjusted to receive trusses having different thickness.

5. A jig as defined in claim 1, wherein:

said truss clamping means have a height extending above the surface of said support means which is less than the thickness of the precut members to permit the clamping means to pass between the rollers of the first roller means.

6. A jig as defined in claim 1, wherein:

each truss clamping means includes a base member adapted to be mounted to the surface of said support means, and a portion of said clamping means includes holding means arranged to move transversely with respect to said base member into contact with a precut member of said truss, said holding means including a rotatable cam attached to a handle for providing said transverse movement; and said elevating means includes guide means mounted vertically from said base member and supporting said holding means, whereby said holding means may be moved from a first lowered position to a second raised position for raising the truss, said guide means further including fluid piston means for moving said holding means from said lower position to said raised position upon the application of fluid pressure.

7. A jig as defined in claim 1, wherein:

said movable support means is an endless conveyor which includes a pair of endless chains and a plurality of flat, elongated rigid plate sections mounted on said chains, said conveyor being arranged around shafts at each end of the conveyor, one of said shafts being positioned between said first and second roller means, whereby the support surface means passes through only said first roller means;

said endless conveyor includes a pair of endless power chains arranged to be reaved around a pair of sprockets mounted on each of said shafts, said chains being interconnected by a plurality of cross members arranged transverse between said chains and spaced along the length of said chains; and said plurality of rigid plate sections are arranged parallel and adjacent to each other to cover a portion of the length of said chains, each of said plate sections being positioned perpendicular to the longitudinal axis of said chains and fastened to each of said chains to form said elongated surface.

8. A jig as defined in claim 7, wherein:

the length of said chains covered by said plate sections is less than one-half of the entire length of said chains.

9. A jig as defined in claim 1, wherein:

the surface of said support means is of sufficient width to permit the assembly of two trusses in a parallel longitudinal arrangement on said surface; and a row of said clamping means being arranged longitudinally along each side of said truss, said clamping means being arranged in alternating fashion to hold the respective truss in proper position.

10. A jig as defined in claim 9, wherein:

all of the clamping means positioned around a truss are connected in series by tubing means, whereby the application of fluid pressure to said tubing means will simultaneously apply pressure to the fluid pressure means of each clamping means causing the entire truss to the raised position at one time and held in this position until the fluid pressure is removed.

* * * * *